United States Patent [19]
Fawcett et al.

[11] Patent Number: 5,790,645
[45] Date of Patent: Aug. 4, 1998

[54] AUTOMATIC DESIGN OF FRAUD DETECTION SYSTEMS

[75] Inventors: Tom Elliott Fawcett, Mohegan Lake, N.Y.; Foster John Provost, Stamford, Conn.

[73] Assignee: NYNEX Science & Technology, Inc., White Plains, N.Y.

[21] Appl. No.: 691,885

[22] Filed: Aug. 1, 1996

[51] Int. Cl.$^6$ .................................................. H04Q 7/38
[52] U.S. Cl. ........................ 379/189; 379/192; 379/197; 455/410
[58] Field of Search .................................. 379/188, 189, 379/191, 192, 194, 197; 455/410, 411, 405, 67.1

[56] References Cited

U.S. PATENT DOCUMENTS

| | | |
|---|---|---|
| 5,335,265 | 8/1994 | Cooper et al. |
| 5,345,595 | 9/1994 | Johnson et al. ............... 455/33.1 |
| 5,541,977 | 7/1996 | Hodges et al. ............... 455/411 |
| 5,555,551 | 9/1996 | Rudokas et al. ............... 379/189 |

*Primary Examiner*—Ahmad F. Matar
*Attorney, Agent, or Firm*—Michaelson & Wallace; Peter L. Michaelson; Michael P. Straub

[57] ABSTRACT

A technique for automatically designing a fraud detection system using a series of machine learning methods. Data mining and constructive induction are combined with more standard machine learning techniques to design methods for detecting fraudulent usage based on profiling customer behavior. Specifically, a rule-learning is used to uncover indicators of fraudulent behavior from a large user database. These indicators are used to create profilers, which then serve as features to the fraud detection system that combines evidence from multiple profilers to generate high-confidence intervention activities when the system is deployed on-line with user data.

21 Claims, 5 Drawing Sheets

AUTOMATIC DESIGN OF FRAUD DETECTION SYSTEMS

BACKGROUND OF THE DISCLOSURE

1. Field of the Invention

This invention relates to fraud detection systems and, more particularly, to the automatic design of fraud detection systems using machine learning and data mining methods.

2. Description of the Background Art

To convey the inventive subject matter of the present invention with concreteness, but without loss of generality, the principles of the present invention are illustrated with reference to fraud detection in the cellular telephony environment. From the description of the principles applied to fraud detection in cellular telephony, it is readily apparent to one with ordinary skill in the art that substantially similar principles may be applied in such other diverse environments such as credit card fraud detection, toll call fraud detection, computer usage fraud detection, and so forth.

Every cellular phone periodically transmits two unique identification numbers, namely, its Mobile Identification Number (MIN) and its Electronic Serial Number (ESN). These two numbers are broadcast in an unencrypted manner over the airwaves, and can be received, decoded and stored using special equipment that is relatively inexpensive. A so-called "cloning" occurs when a customer's MIN and ESN are programmed into a cellular telephone not belonging to the customer. When this cloned telephone is used, the network associates the MIN and ESN with the those assigned to the customer, and subsequently bills the usage to that customer. With the stolen MIN and ESN, a cloned phone user (a so-called "bandit") can make virtually unlimited calls, with the phone charges being billed to the customer. If the fraudulent usage goes undetected, the customer's next bill will include the corresponding charges. Typically, the customer then calls the cellular service provider (the carrier) and denies the usage. The carrier and customer then determine, in a laborious process, which calls were made by the "bandit" and which were legitimate calls. The fraudulent charges are credited to the customer's account, and measures are taken to prohibit further fraudulent charges, typically by assigning the customer new MIN and ESN numbers.

Fraud causes considerable inconvenience both to the carrier and to the customer. Fraudulent usage also fosters significant financial losses due to costs of land-line usage (most cellular calls are to non-cellular destinations), costs of congestion in the cellular system, loss of revenue by the crediting process, and costs paid to other cellular companies when a customer's MIN and ESN are used outside the carrier's home territory. Accordingly, it is well-established that in the United States, cellular fraud costs the telecommunications industry hundreds of millions of dollars per year. "Cloning" is particularly expensive and epidemic in major cities throughout the United States.

Cellular carriers therefore have a strong interest in detecting "cloning" fraud as soon as possible. Existing methods for detecting "cloning" fraud are essentially based upon intuitive rules devised by an telephony mentor having knowledge of fraudulent call usage patterns, but techniques to validate the rules are virtually nonexistent. For instance, one standard method of fraud detection includes analyzing call data for overlapping calls (collisions), or calls in temporal proximity that could not have been placed by the same user due to geographic dispersion (velocity checks). More sophisticated methods involve profiling user behavior and looking for significant deviations from normal patterns. The subject matter of U.S. Pat. Nos. 5,335,265 (Cooper, et al) and 5,345,595 (Johnson, et al) are representative of these existing methods.

Hand-tuned methods devised by a mentor may take several staff-months to render workable. Moreover, it is known that fraud patterns in one region may be significantly different than in another region. Also, the fraud patterns change over time, and lately with increasing frequency. Thus, as the pattern of fraud changes, it is necessary to respond rapidly, such as by devising a new or replacement fraud detection system in a matter of a day or so. One potential manner of devising a fraud detection technique that satisfies the above criteria is that of automatically generating a fraud detection system based upon recent cellular call data. The art, however, is devoid of teachings or suggestions of techniques for the automatic design of methods for detecting fraudulent behavior.

SUMMARY OF THE INVENTION

These problem areas as well as other shortcomings and limitations of the prior art are obviated, in accordance with the present invention, by a methodology for the automatic design of a fraud detection system. Much of the design is accomplished using a series of machine learning methods. In particular, data mining and constructive induction are combined with more standard machine learning techniques to design methods for detecting fraudulent usage of cellular telephones based on profiling customer behavior. Specifically, a rule-learning program is used to uncover indicators of fraudulent behavior from a large database of cellular calls. These indicators are used to create profilers, which then serve as features to the fraud detection system that combines evidence from multiple profilers to generate high-confidence intervention activities when the system is used on-line with customer call data.

In accordance with the broadest aspect of the present invention, the method for automatically generating a fraud detection system from recent user information is effected by first providing rules indicative of fraudulent activity. Then, the rules and the user information instantiate profilers. Finally, learning to combine outputs from the profilers is initiated to train the profilers for detection of fraudulent activity for each user with reference to the user information so as to thereby generate the fraud detection system.

One feature of the arrangement of the present invention is its usefulness in generating a fraud detection system in a relatively brief time frame (for example, overnight) so that the fraud detection system is well adapted to current fraudulent schemes. In addition, the fraud detection system provides measures of fraudulent activity that are not particularly intuitive, so the measures have been overlooked in conventional fraud detection systems.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

After considering the following description, those skilled in the art will clearly realize that the teachings of my invention can be readily utilized to automatically design fraud detection systems with applications in such diverse fields as cellular telephony, toll card usage, credit card usage, and computer usage.

Overview

Figure 1:
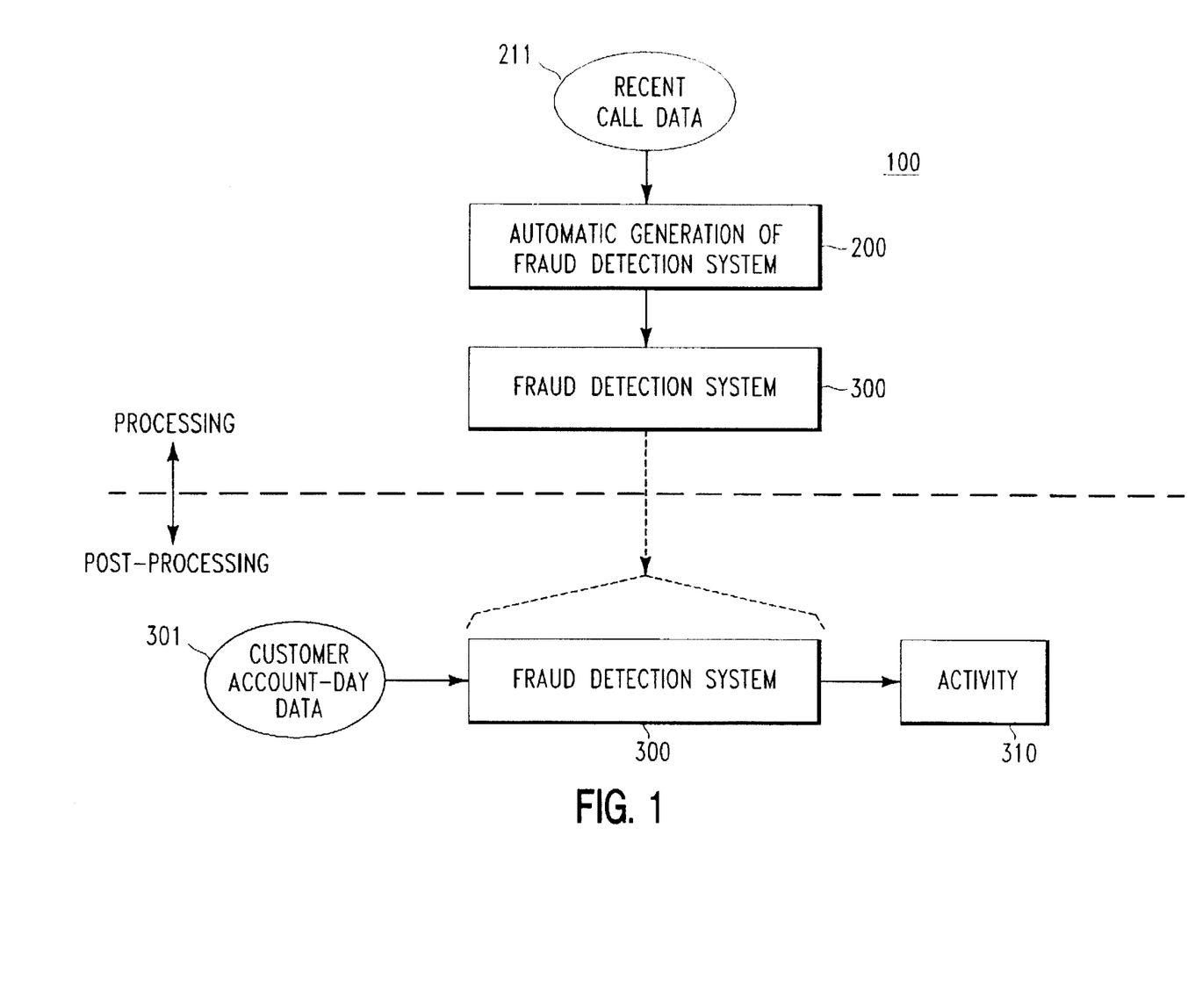
FIG. 1 depicts in block diagram form a processing phase wherein a fraud detection system is automatically generated from historical data with application to cellular telephony, and a post-processing phase wherein the fraud detection system is used with up-to-date customer account-day data.

The block diagram 100 shown in FIG. 1 depicts the distinction between the automatic generation of the fraud detection system (block 200) and the fraud detection system (block 300) itself. Initially, there is an off-line processing phase wherein historical but recent call data 211 is operated on by automatic fraud detection system generator 200 to thereby produce fraud detection system 300. Fraud detection system 300 is then used in another processing phase (a post-processing phase relative to the automatic generation process) to analyze up-to-date customer account data 301 (e.g., an account-day). Fraud detection system 300 typically replaces an existing fraud detection system or, of course, system 300 could be the initial instantiation of a system. The outcome of processing customer data 301 is an activity (block 310) which is dependent upon the local practice of the carrier. For instance, if there is an indication of fraudulent activity on a given customer account, it may be desirable to block all future calls for the given account until the customer is contacted to determine if the calls upon which the decision was based were fraudulent or legitimate. If there is no indication of fraud by system 300, no action is taken for the given customer data 301.

To detect fraud reliably it is necessary to determine the normal behavior of each customer's account with respect to certain indicators, and to determine when that behavior has deviated significantly. Three issues arise:

Issue 1: Which call features are important, that is, which features or combinations of features are useful for distinguishing legitimate behavior from fraudulent behavior?

Issue 2: How should profiles be created, that is, given an important feature identified under Issue 1, how should the behavior of a customer with respect to the feature be characterized?

Issue 3: When action should be taken, that is, given a set of profiling criteria identified under Issue 2, how should the set be combined to determine when fraud has occurred?

The purpose of the present invention is to automate the design of user-profiling systems, and each of these issues corresponds to an element of the automated design.

Figure 2:
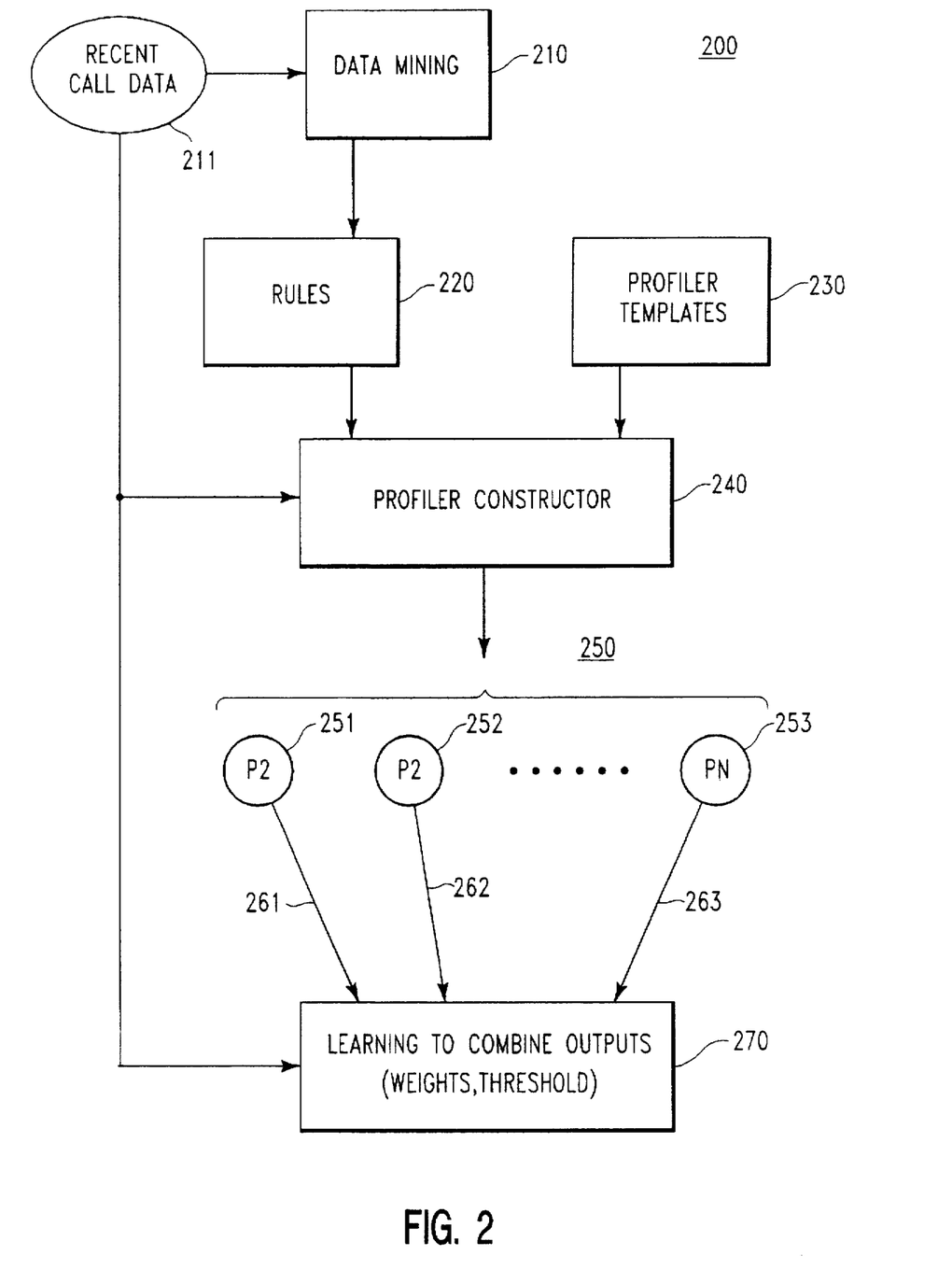
FIG. 2 illustrates a high-level block diagram of the methodology of automatically designing the fraud detection system.

The block diagram 200 shown in FIG. 2 provides a high-level framework for an illustrative embodiment of the present invention. With reference to FIG. 2, data mining process 210 is used to discover indicators/rules of fraudulent behavior with reference to recent call data for numerous customer accounts, as depicted by data block 211; call data 211 is a set of chronological records of the calls associated with each customer, including both fraudulent and legitimate calls. Call data 211 describe individual calls using features such as TIME-OF-DAY, DURATION and CELL-SITE. The rules, which are the outcomes of data mining process 210, are depicted by processing block 220. The rules, along with a predetermined set of profiler templates illustrated by processing block 230, serve as inputs to profiler constructor 240. Profiler constructor 240 then builds, based upon call data 211, a plurality of modules/profilers 250 to profile each user's behavior with respect to these indicators; the individual profilers comprising set 250 are identified as follows: profiler P1 (reference numeral 251), profiler P2 (252), . . . , profiler PN (253). Profilers 250 capture the typical behavior of each customer account and, when employed in an on-line fraud detection system (presented shortly), describe how far a given account is from this typical behavior. Profilers 250 are combined into a single fraud detection system by invoking the processing depicted by block 270, which learns how to detect fraud effectively based on the outputs of profilers 250 and with reference to call data 211 which is used in the learning process. In effect, processing block 270 learns to combine the outputs (also referred generically as evidence) provided by profilers 250 so as to obtain optimized weightings to be applied to data output 261 from profiler 251, to data output 262 from profiler 252, . . . , and to data output 263 from profiler 253, as well as a comparison threshold (usually normalized).

Figure 3:
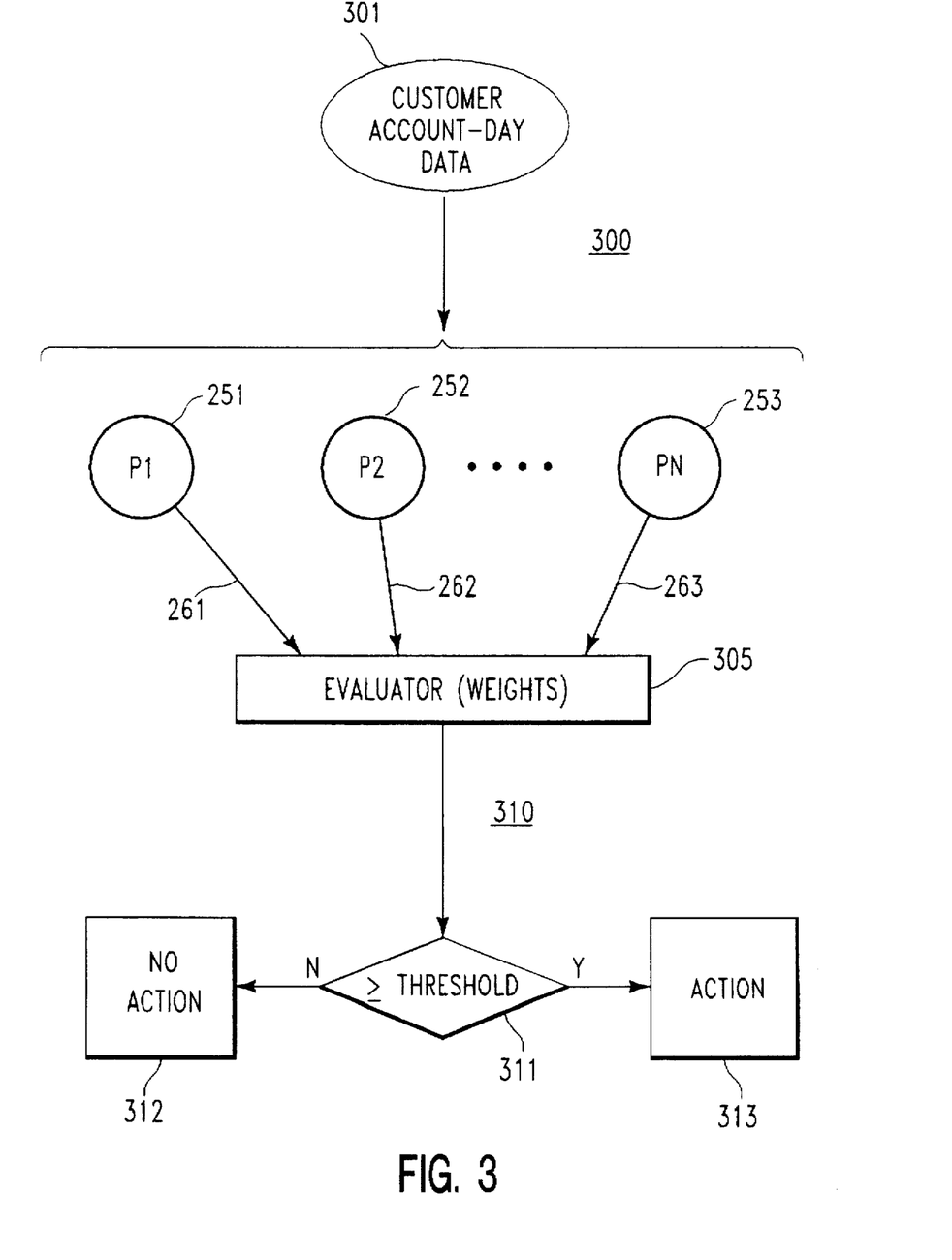
FIG. 3 illustrates the generic use of the fraud detection system designed in accordance with the methodology of FIG. 2.

With reference to FIG. 3, there is shown actual fraud detection system 300 as implemented from the results produced by automatic fraud detection generator 200 of FIG. 2. In particular, system 300 is composed of profilers 251, 252, . . . , 253, evaluator 305, and decision block 310. Evaluator 305 makes use of the final weights as determined from the learning effected by processing block 270 of FIG. 2. In on-line use, daily account data for each customer 301 serves as an input to profilers 251, 252, . . . , 253. The outputs of profilers 251, 252, . . . , 253 are weighted by the respective weights in evaluator 305. The output of evaluator 305 serves as an input to decision block 311, wherein the evaluator output is compared to the threshold established by processing block 270. If the threshold is not equaled nor exceeded, then no action (block 312) is taken, that is, no fraudulent activity has been detected. On the other hand, if the threshold is equaled or exceeded, then detector 300 has sufficient evidence of fraudulent activity on an account, based on the indications of the profilers, so action (block 313) is taken (such as, for example, future calls are blocked, a hotline is called to inform personnel of the potentially fraudulent activity, the customer is contacted immediately, or an alarm is generated).

DETAILS OF ILLUSTRATIVE EMBODIMENT (I) The first stage of the generation of fraud detector 300, as outlined above, is data mining process 210, which involves combing through call data 211 searching for indicators of fraud. Typically, the indicators are conjunctive rules discovered by a standard rule-learning program. An example of such a standard rule-learning program is the RL program, as presented in the article entitled "A Tool for Knowledge-Based Induction" by S. Clearwater and F. Provost, appearing in the *Proceedings of the Second International IEEE Conference on Tools for Artificial Intelligence*, pp. 24–30, IEEE CS Press (1990). The RL program searches for rules with certainty factors above a user-defined threshold. The certainty factor may, for example, be a simple frequency-based probability estimate, corrected for small samples.

As suggested above, call data 211 is organized by account, and each call record is labeled as fraudulent or legitimate. When the RL program is applied to an account's calls, it produces rules (block 220) that serve to distinguish, within that account, the fraudulent calls from the legitimate calls. As an example, the following rule would be a relatively good indicator of fraud:

(TIME-OF-DAY=NIGHT) AND (LOCATION=CITY A)→FRAUD with a Certainty factor=0.89

This rule denotes that a call placed at night from CITY A is likely to be fraudulent. The Certainty factor=0.89 means that, for this account, a call matching this rule has an 89% probability of being fraudulent.

Figure 4:
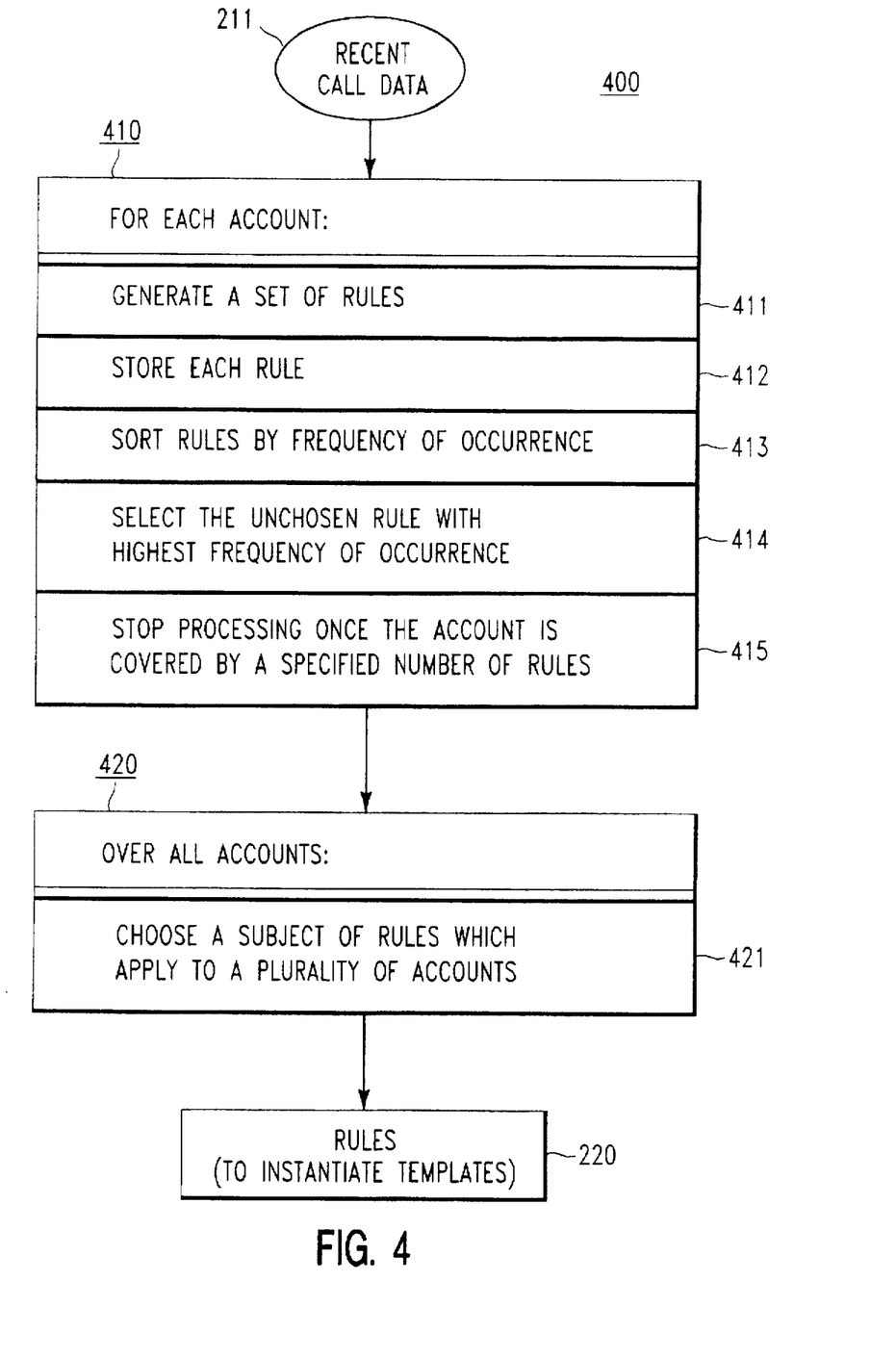
FIG. 4 illustrates a flow diagram for the selection of rules used in the profiler templates to instantiate the profilers.

To illustrate the rule selection process, reference is now made to flow diagram 400 of FIG. 4, which elaborates on data mining process 210 of FIG. 2 to arrive at rules shown by block 220 of FIG. 2. The input to the rule selection process is call data 211. As indicated by block 410, for each account, a series of steps is completed. In particular, processing block 411 is invoked to generates a set of such rules (e.g., by the RL program discussed above). Next, as evidenced by processing block 412, each rule is listed for the account from which it was generated. Then, as shown by processing block 413, the list of rules generated by that account is sorted by the frequency of occurrence in the entire account set. Then, the highest frequency unchosen rule is selected, as denoted by processing block 414. Finally, processing block 415 is used to stop the processing of an account which has been covered already by a predetermined number (e.g., 4) of rules.

As indicated by block 420, there is additional processing which takes place over all accounts upon the completion of processing of the individual accounts. The processing by block 421 chooses a subset of rules which apply to a plurality of accounts (e.g., two or more), the purpose of which is to derive a general covering set of rules that will serve as fraud indicators. The resulting set of rules are the rules shown by block 220 in FIG. 2; this set is used in profiler construction to instantiate the profiler templates, as discussed in detail shortly.

Some exemplary rules are listed below for recent call data 211 from cellular usage in a New York City:

FROM CITY=Brooklyn
TO CITY=Queens
TO STATE=Florida
CELLSITE=CELL-X
TIME-OF-DAY=NIGHT
MOBILE-TO-MOBILE=Yes
AREA CODE and EXCHANGE DIALED=NPA-NXX (II) The second stage in the automatic generation of fraud detection system 300 is the instantiation of set 250 of profilers 251, 252, . . . , 253 from the discovered fraud rules 220. Profiler constructor 240 has as inputs rules 220 and the set of profiler templates 230 which are instantiated by rules 220 to produce the profiler set 250, that is, profiler constructor 240 is given a set of rules and a set of templates, and generates a profiler from each rule-template pair. The construction of each profiler 251, 252, . . . , 253 involves a Training step, in which the given profiler is trained on typical (non-fraud) account activity culled from recent call data 211. Moreover, when fraud detection system 300 is put into service to process customer account-day data 301, each given profiler then effects a Use step, in which the given profiler describes how far from the typical behavior a current account-day is. For example, a simple profiler template is composed of a Rule field, a Training field, and a Use field, as shown in Table 1:

TABLE 1

| Rule: | "Rule" for a selected one of the fraud rules 220 |
|---|---|
| Training: | On a daily basis, count the number of calls that satisfy "rule" from a customer call data 211; keep track of the maximum as "day threshold" |
| Use: | Given customer account-day data 301, output 1 if the number of calls in a day exceeds "day threshold", else output 0 |

It is assumed that the "CITY A-at-night" rule presented earlier is used with this exemplary template. As a result of Training, the instantiated profiler determines, for a given customer account-day data, the maximum number of calls made from CITY A, at night, in any 24-hour period. In Use, this profiler would emit a 1 whenever an account-day exceeded this day threshold. By way of terminology, this profiler is called a "thresholding" profiler.

Other types of profilers are desirable, with each type of profiler being produced by a different type of profiling template defining the predefined set of profiler templates 230. For instance, a "thresholding" profiler yields a binary feature (1 or 0) corresponding to whether or not the customer's behavior is above threshold for the given day. A "percentage" profiler yields a feature whose value is between zero and one hundred, representing the percentage of behavior (e.g., calls or airtime) in the account-day that satisfy the given rule. A "counting" profiler yields a feature whose value is a count of some aspect of behavior (e.g., calls or minutes of use) satisfying the given rule.

(III) The third stage of the automatic generation of fraud detector system 300 learns how to combine evidence from profiler set 250 generated by the previous stage. For this stage, the outputs of the profilers 251, 252, . . . , 253 are used as features to a standard machine learning program.

This third-stage training (which is distinct from the second-stage training discussed above with respect to the profiler templates) is done on recent call data 211, and each profiler 251, 252, . . . , 253 evaluates a complete account-day at a time. In training, the outputs of profilers 251, 252, . . . , 252, appearing respectively on outputs 261, 262, . . . , 263, are presented along with the desired output (the account-day's classification of "fraudulent" or "legitimate"). The evidence combination learns which combinations of profiler outputs 261, 262, 263 indicate fraud with high confidence. (For purposes of providing actual output information illustrative of typical output values, output 261 may provide a count of, say 37, ("counting" profiler), output 262 may provide an value of 55 ("percentage" profiler), and output 263 may convey a value 0 ("thresholding" profiler)).

Many training methods for evidence combining are known in the machine learning art. For example, a simple Linear Threshold Unit (LTU) learning tool to combine evidence is simple and fast. Such an algorithm is discussed in the text "Pattern Classification and Scene Analysis" by Duda and Hart, as published by Wiley and Sons, New York (1973). After training in this stage, evaluator 270 is realized. Evaluator 270 has been trained so that an optimal set of weights to weight the outputs of profilers 251, 252, 253 is known relative to a given threshold. Conventionally, the threshold is normalized to 1.0 (of course, any other threshold is possible—the weights are merely adjusted accordingly during the machine learning step).

As an option, a feature selection process may be used to reduce the number of profilers in set 250 in the final realization of system 300. This feature selection process may be used when, for instance, some of the rules do not perform well when used in profilers, and/or some profilers overlap in their fraud detection coverage. Another machine learning tool such as a "sequential forward selection" algorithm may be invoked to determine a smaller set 250 of useful profilers. This optional step has the benefit of simplifying the realization of system 300 and, oftentimes, increases the accuracy of system 300.

Fraud Detection System 300

Figure 5:
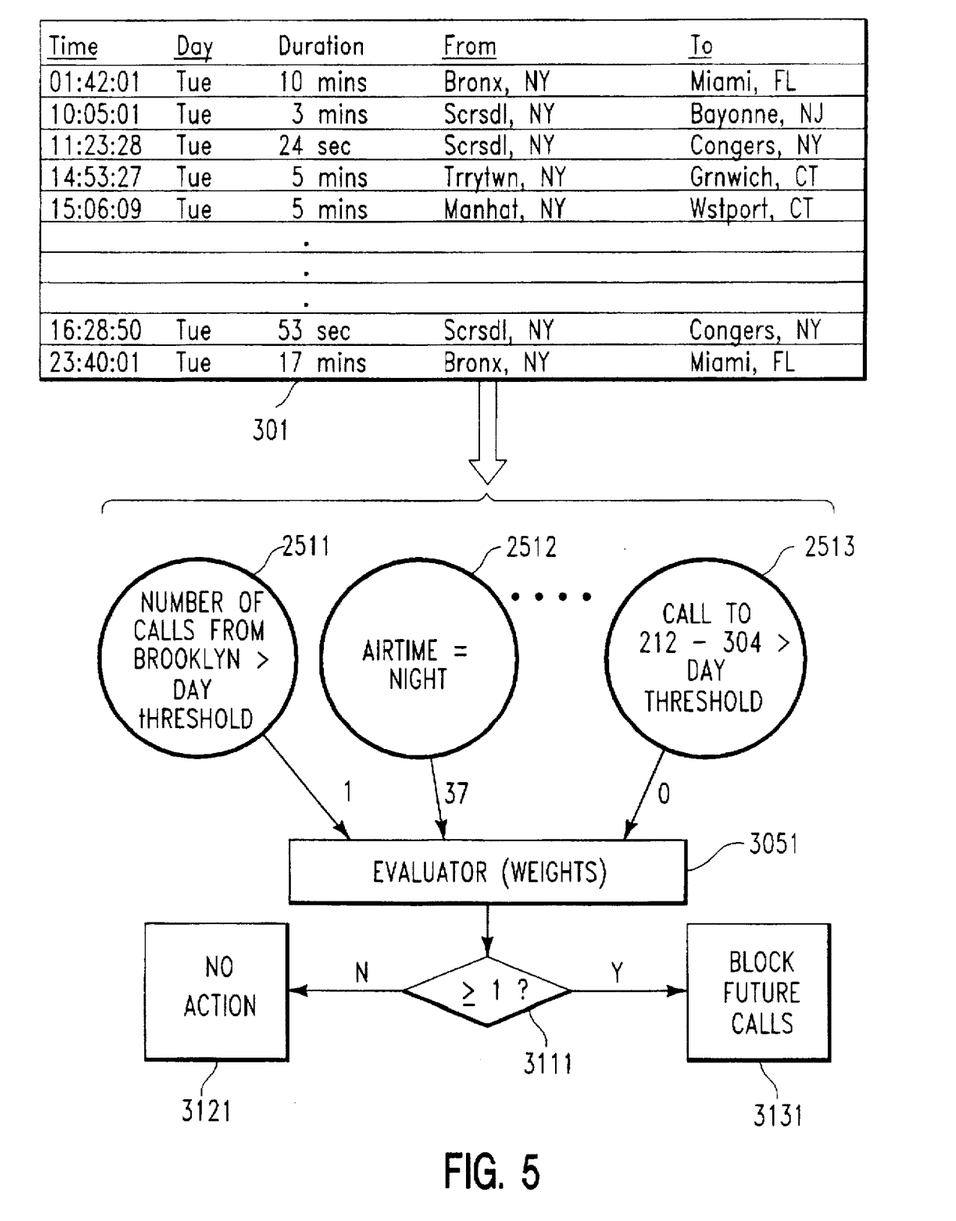
FIG. 5 shows the generated fraud detection system in place operating on exemplary customer account-day data.

As presented above with respect to the discussion of FIG. 1, the output of the automatic generation process 200 is system 300 which is used on-line to detect fraud; system 300 profiles each customer's behavior based on several indicators, and produces an activity 310 if there is sufficient evidence of fraud. FIG. 5 shows an example of a simple but illustrative system 300 as it is used to evaluate incoming customer information, that is, each customer's account-day data 301. In this example, profiler 2511 (a specific realization of profiler 251 with the rule "calls from Brooklyn at night") is a "thresholding" profiler, profiler 2512 (a specific realization of profiler 252 with the rule "airtime=NIGHT") is a "counting" profiler, and profiler 2513 (a specific realization of profiler 253 with the rule calls to 212–304) is a "thresholding" profiler. Decision block 3111 uses a normalized threshold of 1.0, and the particular activity (reference numeral 3131) whenever fraud is uncovered is that of blocking future calls from the cellular phone associated with the customer.

Recent Call Data 211

The following provides exemplary information about the number and characteristics of the calls forming call data 211, which encompassed records of cellular calls placed over four months by users in the New York City area. The calls were labeled as legitimate or fraudulent by cross referencing a database of all calls that were credited as being fraudulent for the same time period. Each call is described by 31 attributes, such as the phone number of the caller, the duration of the call, the geographical origin and destination of the call, and any long-distance carrier used.

Data mining 210 used 610 accounts comprising approximately 350,000 calls.

Once the profiler set 250 was generated, the call data were partitioned into a series of account-days using the outputs of the profilers as features. Data for the profilers were drawn from a pool of about 2500 accounts. Randomly selected sets of 5000 account-days were used for third-stage training. Each account-day set was chosen to comprise 20% fraud and 80% non-fraud days. An account-day was classified as fraud if five or more minutes of fraudulent usage occurred; days including only one to four minutes of fraudulent usage were discarded.

Although various embodiments which incorporate the teachings of the present invention have been shown and described in detail herein, those skilled in the art can readily devise many other varied embodiments that still incorporate these teachings. For instance, whereas the above description was couched in terms of a process of generating a set of rules using data mining and a rule learning program, it is also possible to bypass such a step if a set of rules is provided by, for example, a mentor. Accordingly, the particular RL rule selection technique is merely illustrative of techniques to produce an appropriate set of rules. Also, it is not explicitly necessary to utilize the notion of a template so long as the basic functionality of a template is maintained. In addition, the fraud detection system can be derived for other types of systems (credit card systems, toll card usage, and so forth) by supplying user information available from such systems in place of call data. Moreover, whereas the above descriptions have been couched in terms of block diagrams described by the overall functionality required of the diagrams, more detailed diagrams for carrying out the details of the invention are readily devised from the description.

In addition, the LTU algorithmic technique described was intended to be merely representative (the LTU technique may be called a first-order placeholder) for any machine-learning technique that can learn to combine evidence from multiple outputs for the purpose of yielding a classification (in this case fraud versus no-fraud). An example of a more complex method would be a neural network, which also uses weighted combinations and a threshold, and of which the LTU technique is a degenerate case. A decision-tree system, which is an alternative machine-learning technique, could perform the same task as the LTU technique without using a weighted combination and a threshold.

It is to be understood then that the inventive subject matter is to be limited only by the scope of the claims, which follow.

We claim:

1. A method for automatically generating a fraud detection system from recent user information wherein individual user information is summarized by specified indicators, the method comprising the steps of supplying rules indicative of a subset of the indicators useful in distinguishing legitimate user behavior from fraudulent behavior, instantiating profilers with reference to the user information and the rules, each of the profilers characterizing the behavior of the user with respect to one of the subset of the indicators, and learning to combine outputs from the profilers utilizing the user information to produce a trained set of profilers representative of the fraud detection system.

2. The method as recited in claim 1 wherein the step of learning to combine outputs includes the step of optimizing the learning step.

3. The method as recited in claim 1 wherein the trained set of profilers is characterized by a set of weights to weight the outputs of the profilers and by a comparison threshold, and the step of learning includes the step of determining the set of weights, or the threshold, or both.

4. The method as recited in claim 1 wherein the method is carried out on a programmed digital computer and further including the step of storing the output of the learning step in the computer as program code representative of the fraud detection system.

5. A method for automatically generating a fraud detection system from recent user information wherein individual user information is summarized by specified indicators, the fraud detection system including a set of trained profilers and an evaluator which combines the outputs of the trained profilers for comparison to a comparison threshold, the method comprising the steps of supplying rules indicative of a subset of the indicators useful in distinguishing legitimate user behavior from fraudulent behavior, instantiating profilers with reference to the user information and the rules, each of the profilers characterizing the behavior of the user with respect to one of the subset of the indicators, and learning to combine outputs from the profilers utilizing the user information to produce the trained set of profilers and the comparison threshold.

6. The method as recited in claim 5 wherein the step of learning to combine outputs includes the step of optimizing the learning step.

7. The method as recited in claim 5 wherein the trained set of profilers is characterized by a set of weights to weight the outputs of the profilers, and the step of learning includes the step of determining the set of weights, or the threshold, or both.

8. The method as recited in claim 5 wherein the method is carried out on a programmed digital computer and further including the step of storing the output of the learning step in the computer as program code representative of the fraud detection system.

9. A method for automatically generating a fraud detection system from recent user information wherein individual user information is summarized by specified indicators, the fraud detection system being arranged to process incoming user information, the method comprising the steps of supplying rules indicative of a subset of the indicators useful in distinguishing legitimate user behavior from fraudulent behavior, instantiating profilers with reference to the recent user information and the rules, each of the profilers characterizing the behavior of the user with respect to one of the subset of the indicators, and learning to combine outputs from the profilers utilizing the recent user information to produce a trained set of profilers representative of the fraud detection system, wherein the trained set of profilers is characterized by a set of weights to weight the outputs of the profilers and a comparison threshold, and the step of learning includes the step of determining the set of weights, or the threshold, or both, and wherein to implement the fraud detection system, the profilers process the incoming user information to produce processed outputs, the processed outputs are weighted by the respective weights to produce weighted outputs, and the weighted outputs are combined for comparison with the comparison threshold to determine fraudulent activity.

10. The method as recited in claim 9 wherein the step of learning to combine outputs includes the step of optimizing the learning step.

11. The method as recited in claim 9 wherein the method is carried out on a programmed digital computer and further including the step of storing the output of the learning step in the computer as program code representative of the fraud detection system.

12. A method for automatically generating a telephony fraud detection system from recent call data wherein individual call data is summarized by specified indicators, the method comprising the steps of supplying rules indicative of a subset of the indicators useful in distinguishing legitimate user behavior from fraudulent behavior, instantiating profilers with reference to the call data and the rules, each of the profilers characterizing the behavior of the user with respect to one of the subset of the indicators, and learning to combine outputs from the profilers utilizing the call data to produce a trained set of profilers representative of the fraud detection system.

13. The method as recited in claim 12 wherein the step of learning to combine outputs includes the step of optimizing the learning step.

14. The method as recited in claim 12 wherein the trained set of profilers is characterized by a set of weights to weight the outputs of the profilers and by a comparison threshold, and the step of learning includes the step of determining the set of weights, or the threshold, or both.

15. The method as recited in claim 12 wherein the method is carried out on a programmed digital computer and further including the step of storing the output of the learning step in the computer as program code representative of the fraud detection system.

16. A method for automatically generating a fraud detection system from recent user information wherein individual user information is described by specified indicators, the method comprising the steps of generating rules by processing the user information, the rules being indicative of a subset of the indicators useful in distinguishing legitimate user behavior from fraudulent behavior, defining profiler templates, each of the profiler templates corresponding to a type of profiler, each profiler characterizing the behavior of the user with respect to one of the subset of the indicators, instantiating profilers with reference to the user information, the rules, and the profiler templates, and learning to combine outputs from the profilers utilizing the user information to produce a trained set of profilers for use as the fraud detection system.

17. The method as recited in claim 16 wherein the step of learning to combine outputs includes the step of optimizing the learning step.

18. The method as recited in claim 16 wherein each of the templates includes a rule field, a training field, and a use field, and wherein said step of defining profiler templates includes the steps of defining, for each of the profiler templates, a training operation on the user information for a given one of the rules listed in the rule field, and defining a use operation for processing the user information for the given one of the rules.

19. The method as recited in claim 16 wherein the step of generating includes the step of data mining the user information.

20. The method as recited in claim 16 wherein the trained set of profilers is characterized by a set of weights to weight the outputs of the profilers and a comparison threshold, and the step of learning includes the step of determining the set of weights, or the threshold, or both, and wherein to implement the fraud detection system, the profilers process the incoming user information to produce processed outputs, the processed outputs are weighted by the respective weights to produce weighted outputs, and the weighted outputs are combined for comparison with the comparison threshold to determine fraudulent activity.

21. The method as recited in claim 16 wherein the method is carried out on a programmed digital computer and further including the step of storing the output of the learning step in the computer as program code representative of the fraud detection system.

* * * * *